3,259,517
PROCESS FOR DULLING GLASS FIBERS WITH OXALIC ACID
Everett C. Atwell, Greensboro, N.C., assignor to Burlington Industries, Inc., Greensboro, N.C., a corporation of Delaware
No Drawing. Filed Mar. 18, 1963, Ser. No. 266,013
12 Claims. (Cl. 117—54)

The present invention relates to certain improvements in the treating of glass fibers. More particularly, the invention is concerned with the treatment of glass fibers, which may be in any convenient textile form, for the purpose of producing a dulling effect and otherwise improving the characteristics thereof.

It is well known that fabrics and other products made from glass fibers are reflective and translucent to light and, therefore, characteristically distinguishable in appearance from other conventional textile materials. Because of this, considerable effort has been directed towards developing finishes and treatments which will give a dull or opaque appearance to the glass fibers so that products obtained therefrom will resemble products made with the more conventional types of textile materials. However, despite the extensive amount of work which has been done in this direction, all prior efforts have suffered from one or more disadvantages. For example, it has been proposed to add titanium dioxide or like pigment to woven glass fabrics for the purpose of creating a dulling effect but in order to obtain the desired degree of dullness, such a large amount of titanium dioxide is required that other physical properties, e.g. tensile strength or crack resistance, are undesirably affected. This detrimental effect on other physical properties seems to be generally characteristic of the prior dulling procedures. Another disadvantage in these procedures is the fact that the dulling effect is not permanent and may be removed by repeated laundering.

The principal object of the present invention is to provide a process for treating glass fibers, preferably in the form of woven fabric, whereby the desired degree of dullness or opacity is obtained without the disadvantages encountered in prior techniques. Another object of the invention is the provision of a novel process for dulling glass textiles that gives a product which bears a closer resemblance to the more conventional textile materials in hand and general overall appearance than hitherto possible using the previously known glass fiber finishing techniques. A more specific object of the invention is to provide a finishing treatment which gives a highly desirable dulling effect on glass fibers while at the same time, maintaining or improving the tensile strength and cracking resistance of the fibers. Other objects and advantages of the invention will be hereinafter apparent.

Broadly stated, the foregoing objects are realized by treating the glass fibers, preferably in the form of a woven glass fabric but not necessarily so, with aqueous oxalic acid in the manner hereinafter described. The oxalic acid treatment results in a dulling effect which is unexpectedly good and gives the treated product an opaque appearance which very closely resembles the more conventional textile fibers such as silk. Another surprising aspect of the present invention is the fact that the dullness effect and other property improvements, e.g. increased tensile and crack resistance, resulting from the oxalic acid treatment described herein are permanent and, therefore, remain in the finished product even after repeated laundering.

The unexpected nature of the present process is pointed up by the fact that the results and advantages obtained thereby are not apparently realized when other acids are used in lieu of oxalic acid. For example, formic acid and/or acetic acid cannot be effectively used for present purposes and the same is true with other dibasic acids such as malonic, succinic, glutaric and adipic, which are generally grouped with oxalic acid.

According to the invention, the degree of dullness or opacity can be effectively controlled by appropriate variation of the time and temperature of the oxalic acid treatment and the acid concentration. Advantageously, the treatment may be carried out with an aqueous solution containing from about 0.1% up to about 10% by weight oxalic acid, with 1–6% a preferred range of acid concentration. The important factor is to select an appropriate concentration which will give the desired degree of dulling without tendering the fibers at the times and temperatures used. Usually, the temperature will fall in the range of 80° F. up to the boil (212° F.). The time of treatment may be as low as one second or even a fraction thereof, at higher temperatures (e.g. 190–212° F.) with an appropriate time increase to, for example, 15–45 seconds or even higher, when operating at the lower temperatures in the range mentioned above. One preferred set of conditions comprises 1% oxalic acid solution at 150° F. for 30 seconds. Essentially equivalent results can be obtained using the 1% acid solution at 190° F. for 1–7 seconds. In some instances, optimum effects are obtained in dulling and other physical properties, e.g. tensile strength, using longer times and lower temperatures while in other cases, the effects are optimized at higher temperatures and lower times. The particular conditions adopted for any specific situation will depend at least to some extent on the form of the fibers, e.g. fabric construction, but optimum conditions for each situation can be readily determined by running a few comparisons at different times, temperatures and concentrations.

In a preferred way of practicing the invention, woven glass fabric which has first been heat-cleaned, is subjected to the following sequence of operations in continuous or batch fashion:

PHASE I

Lubricant pad
Dry

PHASE II

Oxalic acid treatment
Squeeze out excess acid
Dry

PHASE III

Apply top binder finish
Dry and cure

The sequence of the phases listed above is important to the success of this preferred embodiment of the invention. For example, the top binder finish (Phase III) should not precede the oxalic acid treatment (Phase II) because this would preclude or minimize the desired dulling reaction between the glass and the acid. Additionally, the acid would wash off in subsequent laundering.

In the Phase I operations, the pad may comprise an aqueous formulation of components which facilitate the subsequent application of the oxalic acid and its reaction with the glass fibers. To insure success, it is important that the pad formulation include an appropriate lubricant for the glass fibers. Glass fiber lubricants are well known in the art and any of these may be used herein. Emulsified polyethylene constitutes a preferred lubricant although such other inert lubricants as castor oil; epoxidized soya bean oil; dimethyl silicone and the various other silicone lubricants described in U.S. Patent 2,754,224; nonionic fatty lubricants (e.g., Cellusoft PXB and Nonionic 20017); cationic softeners and the like may be mentioned as specific examples. Usually the pad composition herein will comprise from 0.5 to 3.0% by weight lubricant (solids) although proportions may be widely varied.

Another important component for the pad is colloidal silica ($SiO_2$) or like inert particular binder. This material (which has previously been used for treating glass fibers, see, for example, U.S. Patents 2,754,224 and 2,992,124) improves the cohesion of the glass fibers and tends to even them out thereby removing or distributing stresses which may exist therein. Generally speaking, the pad composition will comprise from 0.3 to 1.2% by weight of collodial silica or like inert particulate material for this purpose.

The lubricant and inert particulate material mentioned above represent the two essential components of the pad. However, if the fibers are to be subsequently colored, the pad should also include a sufficient amount of one or more appropriate resinous binders to fix or bind the dye or pigment. Typically suitable binders include thermoplastic materials, with or without plasticizer, such as polystyrene, polyacrylic acid derivatives, including polymethyl methacrylate, ethyl methacrylate, and the like, polyvinyl esters such as polyvinyl acetate, polyvinyl chloride and copolymers of vinyl acetate and vinyl chloride, cellulose ethers and esters such as cellulose acetate, ethyl cellulose, and natural and synthetic rubbers. Thermosetting resins may also be used such as the urea-aldehyde melamine formaldehyde and polyester resins.

In the event a resinous binder is used in the pad composition, an appropriate agent for fixing the binder should also be included. This agent may be a chrome complex or more specifically, a Werner complex compound having an acido group coordinated with the trivalent nuclear chromium atom which is capable of strong coordination with the groupings that exist on the glass fiber surfaces, as described in U.S. Patents 2,356,161 and 2,273,040. A typical example of one such chrome complex in "Quilon" which is stearato chromic chloride. In lieu of such complex, or in addition thereto, there may also be used some other binder-fixing material such as a silicone which is water repellent and crosslinks or otherwise reacts with the binder to keep the latter from washing off, softening or being undesirably affected in some other way by the subsequent acid treatment.

The pad composition is usually applied to the glass fabric at room temperature (65–70° F.) although temperatures ranging up to the boil may be used if desired. Solids pickup will generally amount to from 1.0 to 2.0% by weight, based on the dry weight of the fabric, the lubricant and colloidal silica or equivalent representing from 50 to 100% of this pickup, depending on whether or not binder and chrome complex or the like are included in the pad bath.

After the pad, the fabric must be dried and cured before the acid treatment can take place. The temperature used for drying and curing can be widely varied and will depend on the pad composition and other operating conditions. Usually, however, the drying and curing are carried out at temperatures in the range of 250–400° F., typically 350–375° C., with care being taken to avoid tendering or otherwise damaging the fabric. Air or radiant drying means are normally used and as indicated, the time of drying and curing is regulated to accomplish the desired purpose without overexposing the fabric to heat. In a continuous setup, for example, the dry and cure may be accomplished in 20 seconds at 350–375° F.

After drying and curing, the fabric is subjected to the acid treatment as described above. Desirably the fabric is drawn continuously through the aqueous acid solution in a vessel open to the atmosphere and then passed through appropriate squeeze rolls where excess acid is removed. Usually, there is a weight pickup of 60–120% on the weight of dry fabric when the fabric is withdrawn from the acid treatment. The squeeze rolls cut the pickup down to 20 to 40%, based on the dry weight of fabric and the fabric is then subjected to dry heat (heat-quenched) to decompose or otherwise remove any remaining unreacted acid. The drying temperature may run from 320° F. up to for example, 525° F., with 350°–510° F., representing a preferred and practical range. The duration of this heat treatment should not substantially exceed the point where the fabric is dry with times of the order of 15 seconds to 2 minutes normally sufficient.

After drying the fabric, the Phase III top finish is applied. The acid treatment gives the fabric a desirably dull appearance and the purpose of the top finish is to insure the permanence of the dulling effect. Preferably, the top finish is applied by passing the fabric through an open aqueous bath containing one or more suitable resinous binders or fixing agents. Any conventional resinous binder may be used for this purpose including those mentioned heretofore in connection with the Phase I treatment. Preferably the same binders are used in the top finish and the pre-acid pad but different resins may be used if desired. Resin solids pickup in the top finish treatment will normally be in the range of 0.3 to 2% by weight, based on the weight of dry fabric from Phase II.

After application of the top finish, the fabric is again dried and cured at, for example, 212 to 520° F. The resulting products have an extremely desirable dull or opaque appearance with outstanding hand and overall appearance and texture which very closely resemble that of silk or other conventional non-glass fabrics. Tensile strength and cracking resistance usually run 15–20% higher than the strength and resistance of the corresponding fabrics where the oxalic acid treatment has been omitted and, in many instances, the strength of the finished products approaches that of the greige goods before heat-cleaning. Furthermore, as indicated above, repeated laundering does not noticeably alter the dullness of the treated fabric.

The glass fibers treated herein may be of any conventional composition. Typically suitable fibers are those made from so-called "E" glass which has the following approximate composition in parts by weight:

| | |
|---|---|
| Silicone dioxide | 52–56 |
| Calcium oxide | 16–25 |
| Aluminum oxide | 12–16 |
| Boron oxide | 8–13 |
| $Na_2O$ and $K_2O$ | 0–1 |
| Magnesium oxide | 0–6 |

Other suitable glass compositions are shown, for example, in U.S. Patents 2,582,919 and 3,011,929.

The invention is illustrated but not limited by the following examples wherein parts and percentages, unless otherwise stated, are by weight:

*Example I*

A fabric woven with glass "E" yarn in both warp and filling was first heat cleaned using the process shown in U.S. Patent 2,970,934. The heat cleaning process of U.S. Patent 3,012,848 could also be used with equal effect.

The heat cleaned fabric was immersed in a first pad having the following composition:

| | Parts |
|---|---|
| Polycryl 7F1 (Polymer Industries) | 6.0 |
| Ampitol 566 (Dexter Chemicals) | 6.0 |
| Syton DS (duPont) | 3.0 |
| Quilon (duPont) | .75 |
| DC 36 (Dow-Corning) | 2.0 |

Balance: water to make 100 parts.

Of the above components, Polycryl 7F1 is an acrylic resin (specifically a copolymer of methyl and ethyl acrylate) dispersion in water (50% solids); Ampitol 566 is a 20% solids polyethylene emulsion in water; Syton DS is a 30% dispersion of colloidal silica in water; Quilon is a chrome complex (namely, stearato chromic chloride); and the DC 36 is dimethylsilicone (40% solids).

The fabric was dipped in the pad composition, run through a pad, resulting in a wet pickup of 35% based on the fabric weight prior to immersion. The fabric was dried by heating at 375° F. for about 1–1.5 minutes and then immersed in a 3% solution of oxalic acid at 190° F. for 3.5 seconds. The fabric was then again dried by heating at 375° F. for 40 seconds.

Thereafter the fabric was immersed in an aqueous pad comprising 7 parts Polycryl 7F1; 0.5 part Quilon and 92.5 parts water to obtain a wet pickup of 30% by weight. The fabric was then dried and cured by heating at 375° F. for 40 seconds.

The resulting product demonstrated: excellent hand; a desirable degree of opacity and dullness which remained even after repeated washing; and tensile strength and crack resistance which were about 20% greater than the corresponding properties of an identical fabric treated in the same way but omitting the oxalic acid treatment.

*Example II*

The process of Example I was repeated except that a 1% oxalic acid solution was used at 150° F. for 30 seconds with essentially equivalent results in dullness of fabric, hand, tensile strength, crack resistance and overall appearance.

*Example III*

The process of Example I was repeated using the following conditions:

| | Percent |
|---|---|
| Acrylic HA4 (Rohm and Haas) | 12.5 |
| Polyethylene RSC–1514 (Refined Products) | 12.5 |
| Colloidal silica | 2.0 |
| Quilon | 1.0 |

Balance: water to make 100 parts.

Of the above, the acrylic HA4 is a 50% dispersion of acrylic resin (namely the copolymer of methyl and ethyl methacrylate) in water and the RSC–1514 is a 20% polyethylene emulsion in water.

Acid treatment:
    1% oxalic acid solution at 150° F. for 30 seconds; and

Top finish:
    6.0% acrylic HA4
    0.5% Quilon
    Balance: water to make 100 parts The resulting product was dull and remained so even after repeated washing. The crack tensile strength was 20% greater than the corresponding product omitting the oxalic acid treatment.

As will be apparent from the foregoing, the invention herein is preferably applied to woven fabric comprising glass fibers which have previously been coronized or otherwise heat cleaned. Coronizing or heat cleaning of glass fibers and fabrics is well known in the art (see, for example, U.S. Patents 2,970,434 and 3,012,845). Basically, the heat cleaning operation serves to remove fabricating sizes and may be accomplished with or without a flame treatment. Glass fabrics treated by any of the conventional heat cleaning methods may be used for present purposes. Furthermore, while the invention is especially advantageous for the treatment of woven glass fabrics, it will also be appreciated that the oxalic acid treatment herein may be applied to nonwoven fabric or to glass fibers before a fabric is formed. For example, the oxalic acid may be applied to glass yarns during the actual weaving operation or the acid treatment may take place just after the fibers have been spun and quenched, possibly in conjunction with the binding operation. Additionally, as a possible alternative to the use of oxalic acid, there may be occasions when it is preferred to add calcium oxalate to the fibers. Without intending to be limited to this theory or explanation, it appears that the oxalic acid reacts with the calcium in the glass to form calcium oxalate, the latter serving to create the desired dulling or delustering effect herein. The addition of calcium oxalate itself will give the dulling effect but, in contrast to the use of oxalic acid, the oxalate tends to diminish the tensile and/or crack strength and does not offer the overall advantages of the acid treatment.

It will be appreciated that the invention may be used to prepare decorative and industrial fabrics, e.g. drapery or filter materials, which have widely different constructions but are characterized by permanent dulling and improved crack resistance and tensile strength. Novelty fabrics may be prepared, for example, by using a warp or filling glass yarn which has been treated according to the invention and untreated glass yarn or a yarn of a completely different material in the other direction. Other modifications may also be made in the invention described herein without deviating from the scope thereof as set forth in the following claims.

I claim:

1. A process for producing a dulling effect in a glass textile wherein the glass includes calcium which comprises treating said textile with an aqueous solution of oxalic acid and then drying the same.

2. A process for providing a dulling effect in woven glass fabric wherein the glass includes calcium oxide which comprises treating said fabric with an aqueous oxalic acid solution containing 0.1–10% by weight of oxalic acid.

3. The process of claim 2 wherein the fabric is heat cleaned prior to said treatment with oxalic acid.

4. The process of claim 3 wherein said treatment is carried out at a temperature in the range of 80° F. to the boil.

5. The process of claim 3 wherein said treatment is carried out at a temperature in the range of 80° F. to the boil at atmospheric pressure for at least one second.

6. A process for producing a dulling effect and increased crack resistance and tensile strength in heat cleaned woven glass fabric wherein the glass includes calcium oxide which comprises immersing said fabric in aqueous oxalic acid solution containing from 0.1 to 10% by weight of the acid, at a temperature between 80 and 212° F. for at least one second and thereafter drying said fabric.

7. The process of claim 6 wherein the fabric, after drying, is treated with a resinous binder.

8. The process of claim 7 wherein the fabric, before said acid treatment, is treated with an aqueous composition containing a glass lubricant and colloidal silica and then dried.

9. The process of claim 7 wherein the fabric, before said acid treatment, is treated with an aqueous composition containing a glass lubricant, colloidal silica, a resinous color binder and a fixing agent for said binder, and then dried and cured.

10. The process of claim 9 wherein said acid solution contains 1-6% by weight of oxalic acid.

11. A glass textile including calcium oxalate formed in situ by reaction between oxalic acid and calcium in the glass, said textile being characterized by its dull effect and increased crack resistance and tensile strength.

12. A process for producing a dulling effect and increased crack resistance and tensile strength in a glass fabric wherein the glass includes calcium oxide, which comprises treating the fabric with aqueous oxalic acid whereby said oxalic acid and oxide react to form calcium oxalate in situ.

References Cited by the Examiner

UNITED STATES PATENTS 2,407,581   9/1946   Smith et al. _____ 117—118

FOREIGN PATENTS 447,277   3/1948   Canada.
375,045   6/1932   Great Britain.
776,156   6/1957   Great Britain.

ALEXANDER WYMAN, *Primary Examiner.*

JACOB STEINBERG, *Examiner.*